United States Patent [19]
Heard

[11] Patent Number: 5,868,809
[45] Date of Patent: Feb. 9, 1999

[54] CYCLONE REFRACTORY SYSTEM

[75] Inventor: Nolan E. Heard, Avon, Conn.

[73] Assignee: Combustion Engineering, Inc., Windsor, Conn.

[21] Appl. No.: 933,496

[22] Filed: Sep. 18, 1997

[51] Int. Cl.⁶ ............................................. B01D 45/12
[52] U.S. Cl. .......................... 55/337; 55/349; 55/435; 55/49.1
[58] Field of Search .................. 55/269, 435, 337, 55/459.1, 349; 165/95, 134.1; 122/235

[56] References Cited

U.S. PATENT DOCUMENTS

| | | | |
|---|---|---|---|
| 1,890,170 | 12/1932 | Brunt | 122/235 |
| 2,437,294 | 3/1948 | Dalin | 55/269 |
| 3,327,456 | 6/1967 | Guber, Jr. et al. | 55/269 |
| 3,470,678 | 10/1969 | Clark et al. | 55/269 |
| 3,732,920 | 5/1973 | Kimmel | 165/95 |
| 4,615,715 | 10/1986 | Seshamani | 55/269 |
| 4,635,713 | 1/1987 | Johnson et al. | 165/134.1 |
| 4,746,337 | 5/1988 | Magol | 55/269 |
| 4,880,450 | 11/1989 | Magol et al. | 55/269 |
| 4,904,286 | 2/1990 | Magol et al. | 55/269 |
| 4,961,761 | 10/1990 | Johnson | 55/435 |
| 5,160,516 | 11/1992 | Aubry et al. | 55/269 |

Primary Examiner—Jay H. Woo
Assistant Examiner—Minh-Chau T. Pham
Attorney, Agent, or Firm—Robert S. Smith

[57] ABSTRACT

A cyclone and inlet duct apparatus which includes a cyclone having a cylindrical axial portion. The cylindrical axial portion has a metallic housing and the housing has wall. The apparatus also includes a rectangular inlet duct that has an interface with the cylindrical axial portion of the cyclone. The rectangular inlet duct is disposed in fluid communication with the cylindrical axial portion of the cyclone. One side of the rectangular inlet duct is disposed in generally tangential relationship to the wall of the cylindrical axial portion of the cyclone. A first refractory material stop block extends vertically in the cylindrical axial portion of the cyclone proximate to the wall of the cylindrical axial portion and proximate to the intersection of a first side of the inlet duct and the cylindrical axial portion in substantially parallel relationship to the intersection of the first side of the inlet duct and the cylindrical axial portion. The stop block is secured to the wall of the cylindrical axial portion of the cyclone. A plurality of refractory bricks line the cylindrical axial portion of the cyclone. At least some of the reflector bricks abut a side of the first refractory material stop block.

17 Claims, 3 Drawing Sheets

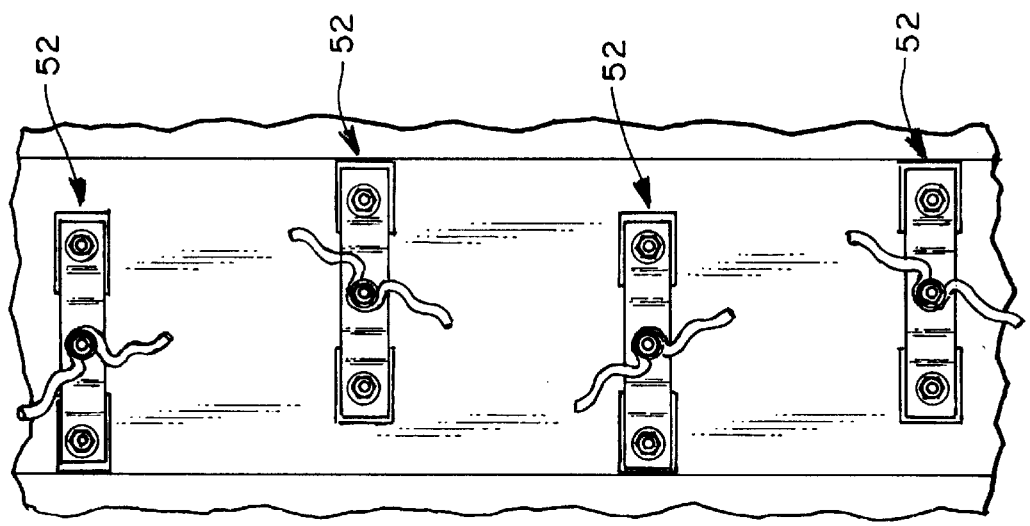
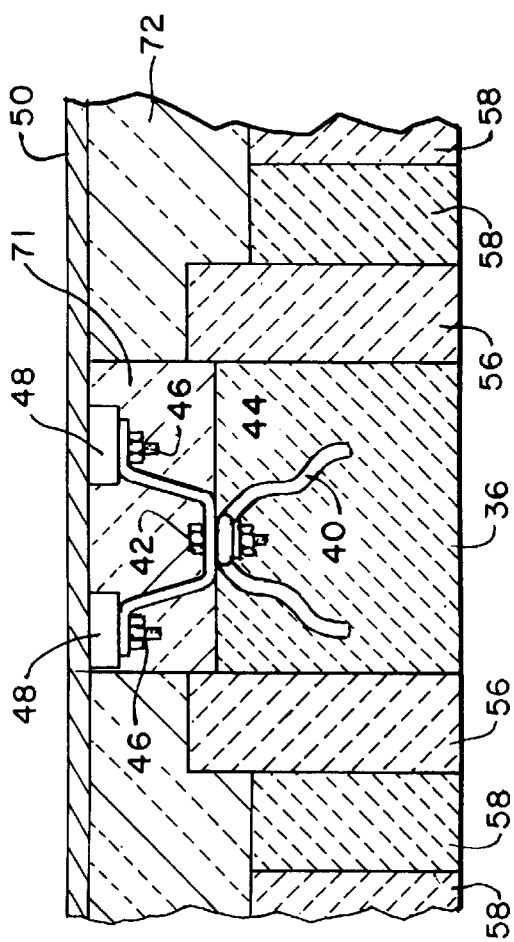
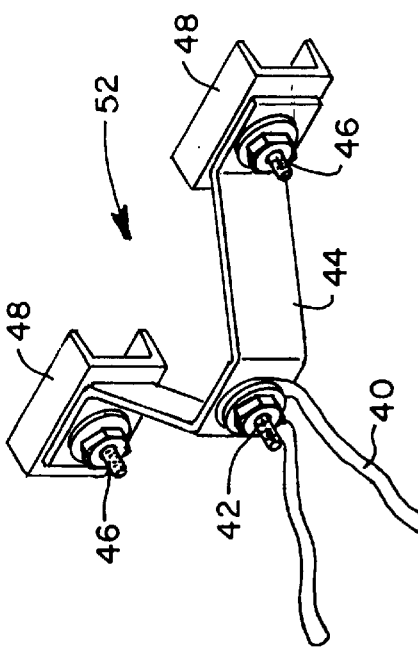

CYCLONE REFRACTORY SYSTEM

BACKGROUND OF THE INVENTION

The invention relates to the refractory system for use in a cyclone or other cylindrical, conical or truncated conical shaped apparatus that handles very hot gases with entrained solids. The cyclone or cyclone separator refers to to a funnel shape device for removing particles from air or other fluids by centrifugal means. Such apparatus is used to remove dust from air or other fluids, steam from water, and water from steam, and certain applications to separate particles into two or more size classes. The cyclone is used to collect the solids entrained in the fluid stream. The present invention has particular application for use in collecting the solids entrained in the hot gases having a furnace of a circulating fluidized bed steam generator, it will be understood that the invention also has application to other cylindrical, conical or truncated conical chambers that handle hot materials and which must be lined with refractory materials because of the high temperatures within the chamber.

Fluidized bed apparatus is being increasingly utilized for a wide variety of applications. The use of a circulating fluidized bed is particularly advantageous because of technological developments which have resulted in significant advances in both operating and fuel flexibility. While the present invention has primary application to a combustion process in a steam generating system, it will be understood that the present invention may also be used in a wide variety of fluidized bed apparatus. Fluidized bed combustion apparatus can bum coal efficiently at temperatures low enough to avoid many of the problems of combustion in other modes. The term "fluidized bed" refers to the condition in which solid materials are given free flowing, fluid-like behavior. As a gas is passed upward through a bed of solid particles, the flow of gas produces forces which tend to separate the particles from one another. At low gas flows, the particles remain in contact with other solids and tend to resist movement. This condition is referred to as a fixed bed. As the gas flow is increased, a point is reached at which the forces on the particles are just sufficient to cause separation. The bed is then deemed to be fluidized. The gas cushion between the solids allows the particles to move freely, giving the bed a liquid-like characteristic.

The fluidizing gas is generally combustion air and the gaseous products of combustion. Two main types of fluidized bed combustion systems are (1) bubbling fluid bed (BFB) in which the air in excess of that required to fluidize the bed passes through the bed in the form of bubbles The bubbling fluid bed is further characterized by modest bed solids mixing rate and relatively low solids entrainment in the flue gas and (2) circulating fluid bed (CFB) which is characterized by higher velocities and finer bed particle sizes. In such systems the fluid bed surface becomes diffused as solids entrainment increases, such that there is no longer a defined bed height. Circulating fluid bed systems have a high rate of material circulating from the furnace to the particle recycle system and back to the furnace. Characteristics of apparatus of this general type are further described in the publication Combustion Fossil Power, edited by Joseph G. Singer, P.E. and published by Combustion Engineering, Inc.; a subsidiary of Asea Brown Boveri, 1000 Prospect Hill Road, Windsor, Conn. 06095, 1991.

In the refractory brick and masonry field it is well-known that a brick lining system will be self supporting when properly installed in a cylindrical configuration contained within a rigid cylindrical steel or high strength concrete structural hoop shaped enclosure. Such refractory brick installations typically include truncated pie shaped bricks having the widest part thereof disposed farthest from the center of the enclosure. In a typical refractory brick array, such as the recycle cyclone of a circulating fluid bed boiler, the structural stability of the lining system is further enhanced by the thermal expansion of the refractory lining with increasing temperature. As the temperature increases the individual bricks expand and even more firmly lock the bricks in place. In a properly designed system at full operating temperature, each individual brick will be in compression and the skin of the external enclosure will be in tension. The stresses are collectively referred to as "hoop stresses". The stability of such a system is dependent on the balance between the two opposing sets of compressive and tensile stresses. When a cylindrical brick lined enclosure is penetrated by any kind of opening it is essential to provide a method to redirect or transfer the hoop stress around the discontinuity inherent in the opening.

In the recycle cyclone of a typical fluid bed boiler, a rectangular cross section inlet duct connects the furnace to the recycle cyclone. The inlet duct intersects the cylindrical (barrel) section near the top of the cyclone. The outside (the side farthest from the geometric axis of the cyclone) wall of the inlet duct is tangent to the steel cylinder which forms the wall of the cyclone barrel. The inside wall of the inlet duct forms an acute angle to the barrel section. Since the cylindrical part of the cyclone is broken by the flat vertical walls of the inlet duct, the inherent hoop stress of the hot face lining must be accommodated in a manner that will insure stability of the system.

In older recycle cyclone refractory lining systems the stresses associated with such discontinuities were transferred to the steel skin of the cyclone enclosure by means of a metallic assembly formed by two steel flange faces fixed at a 90 agree angle. The steel flange faces, in such structures, are braced by a gusset plate web. Such systems have two inherent limitations. First, because of the mass of the steel flange and web, a significant amount of heat is transferred to the outside steel enclosure. This is undesirable because it compromises the efficiency of the thermodynamic system. Second, because of the physical limitations of steel and alloy building materials, the metallic stop block cannot be exposed to the full heat of the gases and solids flowing into the cyclone. The properties of metals, such as steel, that limit use of such metals in such temperature environments include (a) the allowable design stress of a steel component decreases as the temperature increases: (b) long term exposure to high temperature causes detrimental changes in the grain structure of steels and alloys; (c) the rate of heat transfer in a metallic material is a least 10 to 20 times higher than that of a high strength refractory material; and (d) the coefficient of thermal expansion of steel is 3 to 4 times greater than that of typical refractory material. Since the thermal stresses are greatest at the inside surface of the refractory and since the steel support used in the prior art must be positioned back from that face, no support can be placed at the most mechanically advantageous position to resist the thermal stress loading of the inner (and hottest) refractory face.

The design of structure that can physically be placed at the most mechanically advantageous position and which can absorb the hoop stresses is complicated by the non-planar, moment force at the hot face of the lining systems as the result of the varying tensile and compressive forces within the hoop structure.

Another problem with the prior art structure is that the that structure does not equally accommodate tensile and compressive forces because of the geometric shaped employed.

OBJECTS AND SUMMARY OF THE INVENTION

A primary object of the invention is to provide apparatus that will replace the gusseted metallic prior art assembly with apparatus that can exist in the high temperature conditions encountered at the inlet of the cyclone and which includes a structure that can accommodate the high temperatures encountered at a optimum position to restrain the compressive forces of the refractory brick lining.

An object of the invention is to provide structure that will accommodate a twisting, non-planar, movement at the hot face of the lining system due to the varying tensile and compressive forces within the structure.

Another object of the invention is to provide apparatus that can equally accommodate tensile and compressive forces in the hoop Still another object of the invention is to provide better thermal isolation intermediate the refractory bricks and the steel outer wall of the cyclone.

Yet another object of the invention is to provide a structure for cooperation with a refractory wall that can balance the stresses on opposed sides thereof.

It has now been found that these and other objects of the invention may be attained in a cyclone and inlet duct apparatus which includes a cyclone having a cylindrical axial portion. The cylindrical axial portion has a metallic housing; the housing has wall. The apparatus also includes a rectangular inlet duct that has an interface with the cylindrical axial portion of the cyclone. The rectangular inlet duct is disposed in fluid communication with the cylindrical axial portion of the cyclone. One side of the rectangular inlet duct is disposed in generally tangential relationship to the wall of the cylindrical axial portion of the cyclone. A first refractory material stop block extends vertically in the cylindrical axial portion of the cyclone proximate to the wall of the cylindrical axial portion and proximate to the intersection of a first side of the inlet duct and the cylindrical axial portion in substantially parallel relationship to the intersection of the first side of the inlet duct and the cylindrical axial portion. The stop block is secured to the wall of the cylindrical axial portion of the cyclone and a plurality of refractory bricks lines the cylindrical axial portion of the cyclone. At least some of the refractory bricks abuts a side of the first refractory material stop block.

Some forms of the invention further include a second refractory material stop block extending vertically in the cylindrical axial portion of the cyclone proximate to the wall of the cylindrical axial portion and proximate to the intersection of a second side of the inlet duct and the cylindrical axial portion in substantially parallel relationship to the intersection of the second side of the inlet duct and the cylindrical axial portion, the second refractory material stop block is secured to the wall of the cylindrical axial portion of the cyclone, at least some of the refractory bricks abutting a side of the second refractory material stop block.

The first refractory material stop block and the second refractory material stop block may both be elongated and have a length that is at least as great as the height of the inlet duct whereby the first and second refractory material stop blocks can accommodate hoop stress. Each of the first and second refractory material stop blocks may have a plurality of anchors molded within the axial extent thereof.

The apparatus may further includes a plurality of brackets and each of the anchors is secured by one of the brackets to the wall of the cylindrical axial portion of the cyclone. In some cases each of the brackets is generally V-shaped and has an apex and first and second legs, the apex of each of the brackets is fixed to one of the anchors and the apparatus further includes first and second channels fixed respectively to the first and second legs of each of the brackets. Each of the brackets may be fixed to one of the anchors by a nut and bolt and each of the first and second channels may be fixed to one of the brackets by a nut and bolt.

Some forms of the invention further include a third refractory material stop block extending vertically within the rectangular inlet duct, the third refractory material stop block being fixed to the one side of the rectangular inlet duct in spaced parallel relationship to the first refractory material stop block. A plurality of refractory bricks are disposed along the one side of the rectangular inlet duct intermediate the first refractory material stop block and the third refractory material stop block. Other forms of the invention further include a fourth refractory material stop block extending vertically within the rectangular inlet duct that is fixed to the second side of the rectangular inlet duct in spaced parallel relationship to the second refractory material stop block with a monolithic refractory material extending along the second side of the rectangular inlet duct intermediate the second refractory material stop block and the fourth refractory material stop block.

In other forms of the invention the cyclone has a truncated conical shaped lower section, the lower section is lined with a plurality of courses of refractory bricks, at least one or more of the courses includes a refractory support ring.

BRIEF DESCRIPTION OF THE DRAWING

The invention will be better understood by reference to the accompanying drawing in which:

FIG. 4 is a fragmentary sectional view taken along a horizontal plane extending through one stop block and the adjacent structure in a portion of the wall all of the cyclone and which shows the mounting of the floating stop block and the associated steel outer structure and other refractory structure.

FIG. 5 is a fragmentary elevational view of the inner wall of the cyclone before the in situ casting of the stop block.

FIG. 6 is a perspective view of the mounting for the stop block in accordance with the present invention.

DESCRIPTION OF THE PREFERRED EMBODIMENT

Figure 1:
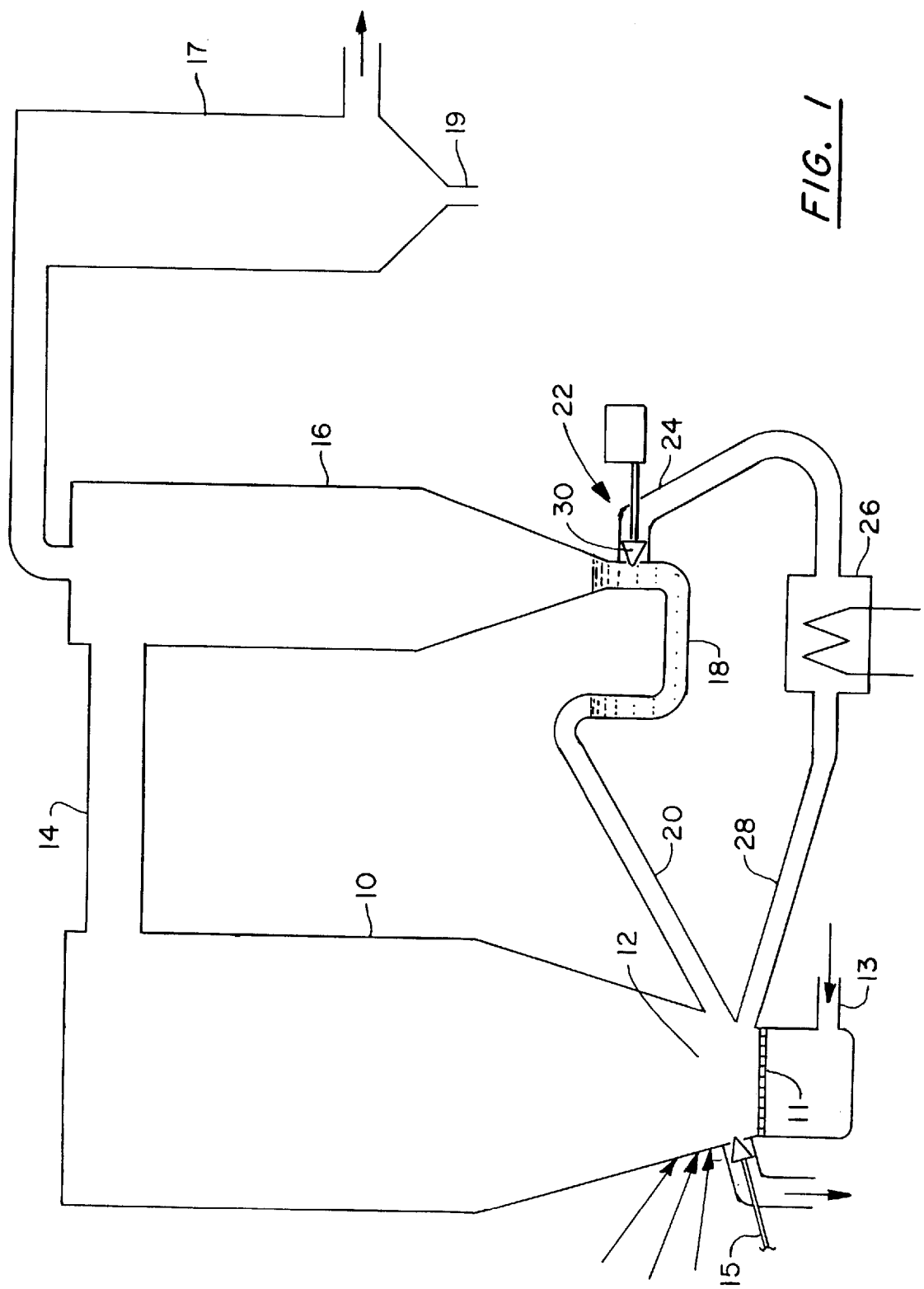
FIG. 1 is a partially schematic elevational view of a typical circulating fluidized bed furnace apparatus that incorporates the refractory system in accordance with the present invention.

Referring now to the overall schematic of FIG. 1 there is shown a vertically elongated furnace 10 in which is disposed a circulating fluidized bed 12. The circulating fluidized bed 12 is disposed on a base plate 11. Primary air is supplied to the bed 12 through a port 13 disposed below the base plate 11. Secondary air, limestone and fuel are directed into the side of the bed 12 as indicated by the three arrows on the left side (as viewed) of the furnace 10. The air, limestone, and fuel in the bed 12 react in a combustion process within the furnace. The fuel typically is a fossil fuel. The limestone is a sorbent. A bottom ash control valve 15 is also disposed on the left side of the furnace 10. The particles in the circulating fluidized bed 12 are recirculated through a gas pass 14 to one or more cyclones 16 (one shown). Each cyclone 16 is vertically elongated and has the lower extremity connected to a seal pot 18. The top of each cyclone 16 is coupled to a back pass 17 that contains additional heat transfer surfaces. The arrow indicating movement out of the back pass 17 indicates flue gas flow to a dust removal apparatus and a stack (not shown). Additional ash is removed from the lower extremity 19. Each seal pot 18 has a shape and function somewhat comparable to the trap commonly connected to the drain of residential and commercial sinks. The seal pot 18 is coupled to the furnace 10 by a first return duct 20. An ash control valve 22 modulates flow out of the seal pot 18 through a refractory lined housing 24 that is coupled to a heat exchanger 26 and a second return duct 28. The second return duct 28 completes the path from the seal pot 18, through the heat exchanger 26 to the furnace 10. The first and second return ducts 20, 28, as well as the seal pot 18, are refractory lined.

Figure 2:
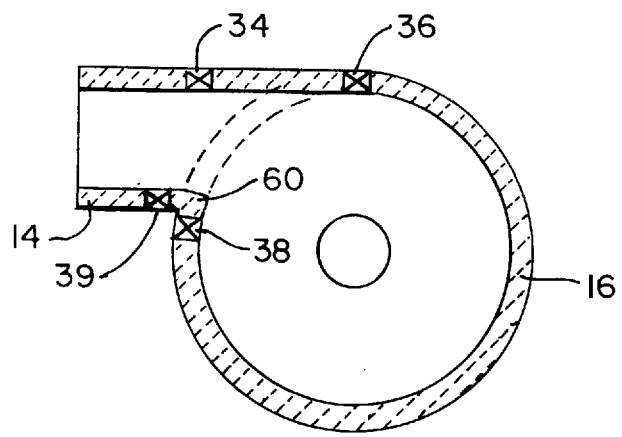
FIG. 2 is a cross section taken along a horizontal plane that extends through the upper cylindrical (barrel) part of the cyclone and the inlet duct and which illustrates the location of the floating stop blocks near the discontinuity caused by be inlet duct.
Figure 3:
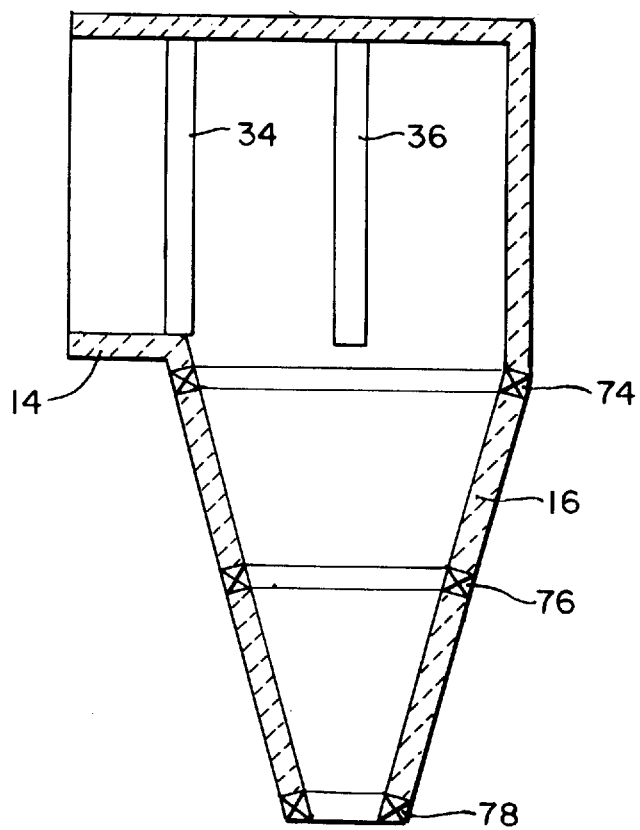
FIG. 3 is a partially schematic cross-section taken along the vertical plane defined by the intersecting axis of the cyclone and the axis of the inlet duct.

The gas pass 14 is also the inlet duct for the cyclone 16. The geometric relationship between the inlet duct 14 and the cyclone 16 will be better understood by referring to FIGS. 2 and 3 of the drawing. FIGS. 2 and 3 represent substantially the physical structure of the preferred embodiment of the invention as opposed to the more schematic FIG. 1 which is intended merely to show the relationship between the components of the fluidized bed furnace system. The cyclone 16 has an upper axial part, as will be apparent from FIGS. 2 and 3 that is cylindrical and a lower axial part that is a truncated cone. The gas pass or inlet duct 14 intersects the cylindrical part of the cyclone 16 in a generally tangential relationship The inlet duct 14 has a generally rectangular cross section. One planar side is referred to herein as the outside side because it is the side farthest from the geometric center of the cyclone. The outside side of the inlet duct 14 is planar and is disposed in tangential relationship to outer face of the cylindrical barrel section of the cyclone 16. As best seen in FIG. 2 the opening in the wall of the cyclone 16, for the inlet duct 14 is a discontinuity in the structural hoop at the top of the cyclone 16. In other words, be structural hoop is broken by the flat walls of the inlet duct 14. Thus, the inherent hoop stress of the refractory lining must be accommodated in a manner that will insure stability of the system.

FIG. 2 illustrates the location of four vertical stop blocks 341 36, 38, 39 in the preferred embodiment of the invention. The stop blocks 34, 36 transfer the hoop stress to the steel cyclone structure while allowing some movement to accommodate the normal structural movement. It will be seen that the stop blocks 36, 38 are disposed around the discontinuity at the interface of the cyclones 16 and the inlet duct 14. More specifically, the stop block 38 is circumferentially adjacent to the intersection of the inboard side (the side nearest the geometric center of the cyclone 16) of the inlet duct 14 and the cyclone 16. Similarly, the stop block 36 is circumferentially adjacent to the intersection of the outboard side (the side farthest from the geometric center of the cyclone 16) of the inlet duct 14 and the cyclone 16. Thus, stop blocks 36, 38 accommodate the hoop stress of the refractory lining.

In addition to in the problem of accommodating the hoop stress their are other concerns in the design of the overall inlet duct 14 and cyclone 16 structure. The interior of the cyclone 16 is lined with refractory bricks 56, 58 as best seen in FIG. 4. This material and construction is essential because of the abrasive nature of the materials flowing within the cyclone 16. Typically the top of the cyclone 16 will be lined with a monolithic refractory material which may be applied pneumatically with a pressure gun or cast. The monolithic refractory material is satisfactory at that location because that surface is not exposed to the severe erosion problems and that are encountered elsewhere within the cyclone 16.

Monolithic refractory material 60 is also used to cover the interface between the inboard side of the inlet duct 14 and the cyclone 16. The monolithic refractory material 60 is used at this part of the assembly because of the difficulty of positioning discrete refractory bricks at this corner. Similarly, the axial part of the inboard side of the inlet duct 14 that extends from the stop block 39 to the left, as viewed in FIG. 2, is lined with a monolithic refractory material. Also, the outboard side of the inlet duct 14 in the is provided with two sections of monolithic refractory material. A first section is intermediate the stop blocks 34 and 36 and another section (having a different composition) of monolithic refractory material is provided to the left, as viewed in FIG. 2, of the stop block 34. The stop blocks 34, 39 served to isolate different kinds of insulation. In other words, the stop block 34 isolates the two different kinds of monolithic refractory material that all are disposed along the outside wall of the inlet duct 14. The stop block 39 isolates the monolithic refractory material 60 at the interface between the inlet duct 14 and the cyclone 16 from the monolithic refractory material that extends to the left of the stop block 39. The stop blocks 34, 39 are disposed in the inlet duct 14 in spaced parallel relationship to the stop block 36. All of the stop blocks 34, 36, 38 are elongated and have the respective axes thereof extending vertically. Thus, the stop blocks 34, 36, 38 are mutually parallel and each is parallel to the geometric axis of the cyclones 16.

The axial extent of the stop blocks 34,36 is further shown in FIG. 3. The axial extent of the stop block 38 will be understood to be substantially the same as the stop blocks 36. The stop blocks 38, 39 do not appear in FIG. 3 because of the location of the plane along which this sectional view is taken. It will be further seen from FIG. 3 that the axial extent of each of the stop blocks 34 is substantially the same as the height of the inlet the duct 14. The height of the stop block 39 has the same height. The stop block 36 (which has the same height as stop block 38 extends vertically the full extent of the discontinuity introduced by the inlet duct 14 and in the preferred embodiment the full height of cylindrical portion of the cyclone 16. In many cyclones the cylindrical portion will constitute a larger axial portion of the total height of the cyclone than the portion shown in FIG. 3.

Referring now to FIGS. 4, 5 and 6 there is shown a stop block 36 which is molded in situ to a plurality of anchors 40 that are part of respective support assemblies 52. The anchors 40 block manufactured of 309 stainless-steel in the preferred embodiment. Each anchor 40 is coupled by a nut and bolt assembly 42 to a V-shaped bracket 44 that is in turn connected by bolts 46 to respective channels 48. Each channel has an elongated slot (not shown) which engages the nut and bolt assembly 42. The elongated slot allows relative motion between the channel 48 (which is welded to the wall of the cyclone or inlet duct) and the bracket 44. A ceramic fiber insulation (not shown) is positioned within each of the nut and bolt assemblies 42, 46. The channels 48 are welded to the steel casing or housing 50 of the cyclone 16 or the wall of the inlet duct 14. FIG. 6 illustrates a single support assembly 52 in a perspective view. FIG. 5 shows a vertically extending array of support assemblies 52 mounted on the casing or housing 50 of the cyclone 16. The in situ molding of high strength refractory concrete is accomplished on the array of support assemblies 52 shown in FIG. 5. As will be apparent from FIG. 5, adjacent support assemblies 52 are circumferentially offset. In other words, in a given vertically extending array of support assemblies 52 intended for cooperation with a single stop block 34, 36, 38, 39 every other support assembly 52 is aligned with a common vertical line. All of the intervening support assemblies 52 are aligned with a second vertical line. Thus, successive support assemblies 52 in a single array supporting a single stop block 34, 36, 38 or 39 are horizontally offset. The housing 50 of the cyclone 16 is further protected from the extremely high temperatures within the cyclone 16 and the inlet duct 14 by a preformed insulation 70, 71, 72. (Although discrete numerals 70, 71, and 72 are used to describe this material it will be understood that the preferred form of the invention has one monolithic piece of such insulation.

After the in situ formation of the stop blocks 34, 36, 38 the rest of the construction of the wall of the cyclone 16 and inlet duct 14 is completed. As best seen in FIG. 4 there are support assemblies 52 along the face of the cyclone 16 housing or casing. FIG. 4 illustrates one of the respective arrays of V-shaped brackets 44 that support each of the stop blocks 34, 36, and 38. This ceramic fiber insulation 54 protects the steel structure of the cyclone 16. Thereafter, refractory bricks 56 are positioned along each side of each stop block 34, 36, 38, 39 and then a plurality of refractory bricks 58 are positioned all around the circumferential extent of the interior of the cyclone 16. The size of the refractory bricks 56 that are immediately adjacent to the stop block 36 is larger than the bricks 58 to spread the forces over the entire surface area of the side of the stop block 36.

The lower, as viewed, extent of the cyclone 16 is a truncated conical shape. The truncated conical shaped part of the cyclone 16 is lined in the usual and customary way with refractory bricks that are arrayed in courses that are circular when viewed from above. (it will be understood that one layer of refractory bricks is referred to as a course.) To further stabilize this structure and support the very large collective weight of all of the refractory bricks the invention utilizes a plurality of support brackets 52 disposed at intervals around the perimeter of each of three unitary support rings 74, 76, and 78 disposed in three axially spaced courses. In the preferred form of the invention in situ molded unitary support rings 74, 76, 78 are molded on a plurality of anchors 40 of a support members 52. The support rings 74, 76, and 78 are disposed at axially spaced intervals within the lower truncated conical part of the cyclone 16. In a preferred form of the invention the rings 74, 76, and 78 which have the same form as the collective form of one course of bricks are positioned at three different courses within the truncate conical part of the cyclone 16. These support rings may alternatively be referred to as the upper course 74, midcourse 76 and bottom course 78. It will thus be seen that the in situ cast rings 74, 76, 78 will support the collective weight of the courses of refractory bricks that are disposed above each of these in situ cast support rings 74, 76, and 78.

The invention has been described with respect to its preferred embodiment. Persons skilled in art of such devices may upon exposure to the teachings herein conceive other variations. Such variations are deemed to be encompassed by the disclosure, the invention being delimited only by the following claims.

I claim:

1. A cyclone and inlet duct apparatus which comprises:

a cyclone having a cylindrical axial portion, said cylindrical axial portion having a metallic housing, said housing having a wall;

a rectangular inlet duct, said rectangular inlet duct having an interface with said cylindrical axial portion of said cyclone, said rectangular inlet duct being disposed in fluid communication with said cylindrical axial portion of said cyclone; one side of said rectangular inlet duct being disposed in generally tangential relationship to said wall of said cylindrical axial portion of said cyclone;

a first refractory material stop block extending vertically in said cylindrical axial portion of said cyclone proximate to said wall of said cylindrical axial portion and proximate to the intersection of a first side of said inlet duct and said cylindrical axial portion in substantially parallel relationship to the intersection of said first side of said inlet duct and said cylindrical axial portion, said stop block being secured to said wall of said cylindrical axial portion of said cyclone; and a plurality of refractory bricks lining said cylindrical axial portion of said cyclone, at least some of said refractory bricks abutting a side of said first refractory material stop block.

2. The apparatus as described in claim 1 further including:

a second refractory material stop block extending vertically in said cylindrical axial portion of said cyclone proximate to said wall of said cylindrical axial portion and proximate to the intersection of a second side of said inlet duct and said cylindrical axial portion in substantially parallel relationship to the intersection of said second side of said inlet duct and said cylindrical axial portion, said second refractory material stop block being secured to said wall of said cylindrical axial portion of said cyclone, at least some of said refractory bricks abutting a side of said second refractory material stop block.

3. The apparatus as described in claim 1 wherein:

said first refractory material stop block and said second refractory material stop block are both elongated and have a length that is at least as great as the height of said inlet duct whereby said first and second refractory material stop blocks can accommodate hoop stress.

4. The apparatus as described in claim 3 wherein:

each of said first and second refractory material stop blocks have a plurality of anchors molded within the axial extent thereof.

5. The apparatus as described in claim 4 wherein:

said apparatus further includes a plurality of brackets and each of said anchors is secured by one of said brackets to said wall of said cylindrical axial portion of said cyclone.

6. The apparatus as described in claim 5 wherein:

each of said brackets is generally V-shaped and has an apex and first and second legs.

7. The apparatus as described in claim 6 wherein:

said apex of each of said brackets is fixed to one of said anchors.

8. The apparatus as described in claim 7 wherein:

said apparatus further includes first and second channels fixed respectively to said first and second legs of each of said brackets.

9. The apparatus as described in claim 8 wherein:

each of said brackets is fixed to one of said anchors by a nut and bolt.

10. The apparatus as described in claim 9 wherein:

each of said first and second channels is fixed to one of said brackets by a nut and bolt.

11. The apparatus as described in claim 3 further including
   a third refractory material stop block extending vertically within said rectangular inlet duct, said third refractory material stop block being fixed to said one side of said rectangular inlet duct in spaced parallel relationship to said first refractory material stop block.

12. The apparatus as described in claim 11 further including:
   a plurality of refractory bricks extending along said one side of said rectangular inlet duct intermediate said first refractory material stop block and said third refractory material stop block.

13. The apparatus as described in claim 12 further including:
   a fourth refractory material stop block extending vertically within said rectangular inlet duct, said fourth refractory material stop block be fixed to said second side of said rectangular inlet duct in spaced parallel relationship to said second refractory material stop block.

14. The apparatus as described in claim 13 further including:
   a monolithic refractory material extending along said second side of said rectangular inlet duct intermediate said second refractory material stop block and said fourth refractory material stock block.

15. The apparatus as described in claim 14 wherein:

said cyclone has a truncated conical shaped lower section, said lower section being lined with a plurality of courses of refractory bricks, at least one of said courses being a first unitary support ring fixed to said lower section of said cyclone.

16. The apparatus as described in claim 15 wherein:

said apparatus further includes a least a second course in said truncated conical shaped lower section that is a unitary support ring fixed to said lower section of said cyclone, said second course being disposed in spaced relationship to said one course.

17. The apparatus as described and claim 16 wherein:

said apparatus further includes at least a third course in said truncated conical shaped lower section that is a unitary support ring fixed to said lower section of said the cyclone, said third course being disposed in spaced relationship to both said one course and said second course.

* * * * *